(12) United States Patent
Lu et al.

(10) Patent No.: US 7,038,192 B2
(45) Date of Patent: May 2, 2006

(54) OPTICAL SENSOR METHOD, SYSTEM AND APPARATUS

(75) Inventors: Jyh-Woei J. Lu, Chandler, AZ (US); John N. Tervo, Scottsdale, AZ (US); William R. Rapoport, Bridgewater, NJ (US); Dwayne M. Benson, Tempe, AZ (US); Devlin M. Gualtieri, Ledgewood, NJ (US)

(73) Assignee: Honeywell International, Inc., Morristown, NJ (US)

( * ) Notice: Subject to any disclaimer, the term of this patent is extended or adjusted under 35 U.S.C. 154(b) by 636 days.

(21) Appl. No.: 10/155,480

(22) Filed: May 23, 2002

(65) Prior Publication Data

US 2003/0217772 A1    Nov. 27, 2003

(51) Int. Cl.
*G01D 5/34* (2006.01)

(52) U.S. Cl. .................................. 250/231.13
(58) Field of Classification Search ............ 250/227.15, 250/237 G, 226, 231.13; 128/665; 341/13
See application file for complete search history.

(56) References Cited

U.S. PATENT DOCUMENTS

| | | | |
|---|---|---|---|
| 4,428,194 A | 1/1984 | Stokes et al. | |
| 4,445,532 A | 5/1984 | Mitchell | |
| 4,458,718 A | 7/1984 | Vick | |
| 4,553,474 A | 11/1985 | Wong et al. | |
| 4,768,555 A | 9/1988 | Abel | |
| 4,964,422 A | 10/1990 | Ball et al. | |
| 4,964,431 A | 10/1990 | Ball et al. | |
| 4,967,778 A | 11/1990 | Ball et al. | |
| 5,000,213 A | 3/1991 | Tervo et al. | |
| 5,005,804 A | 4/1991 | Andersen et al. | |
| 5,029,599 A | 7/1991 | Ball | |
| 5,067,506 A | 11/1991 | Ball et al. | |
| 5,068,528 A * | 11/1991 | Miller | 250/231.13 |
| 5,102,097 A | 4/1992 | Davis et al. | |
| 5,110,441 A * | 5/1992 | Kinlen | 204/418 |
| 5,113,910 A | 5/1992 | Ball | |
| 5,250,805 A * | 10/1993 | Park | 250/237 G |
| 5,334,090 A | 8/1994 | Rix | |
| 5,351,934 A | 10/1994 | Jensen et al. | |
| 5,386,848 A | 2/1995 | Gilchrist et al. | |
| 5,590,852 A | 1/1997 | Olson | |
| 5,899,064 A | 5/1999 | Cheung | |
| 5,927,335 A | 7/1999 | Christensen | |
| 5,965,877 A * | 10/1999 | Wood | 250/227.15 |
| 6,006,780 A | 12/1999 | Tseng et al. | |
| 6,157,025 A * | 12/2000 | Katagiri | 250/226 |
| 6,233,919 B1 | 5/2001 | Abel et al. | |

* cited by examiner

*Primary Examiner*—Thanh X. Luu
*Assistant Examiner*—Tony Ko
(74) *Attorney, Agent, or Firm*—Ingrassia Fisher & Lorenz

(57) ABSTRACT

An optical sensor system and method for determining the position, displacement and/or angle of a member (for example, a seal plate or valve gate) within a system (for example, a valve assembly in an aircraft turbine engine system or environmental control system). The system has, in one embodiment, a controller in communication with an encoder via a fiber optic line or similar light transmitter and the encoder further has an optically layered element. The optically layered element has at least one coating whose optical characteristics vary over the angles (or distance) of interest to provide feedback based on the position displacement and/or angle of the valve member. The system may communicate and/or be controlled by a computing system via a data communication network.

39 Claims, 13 Drawing Sheets

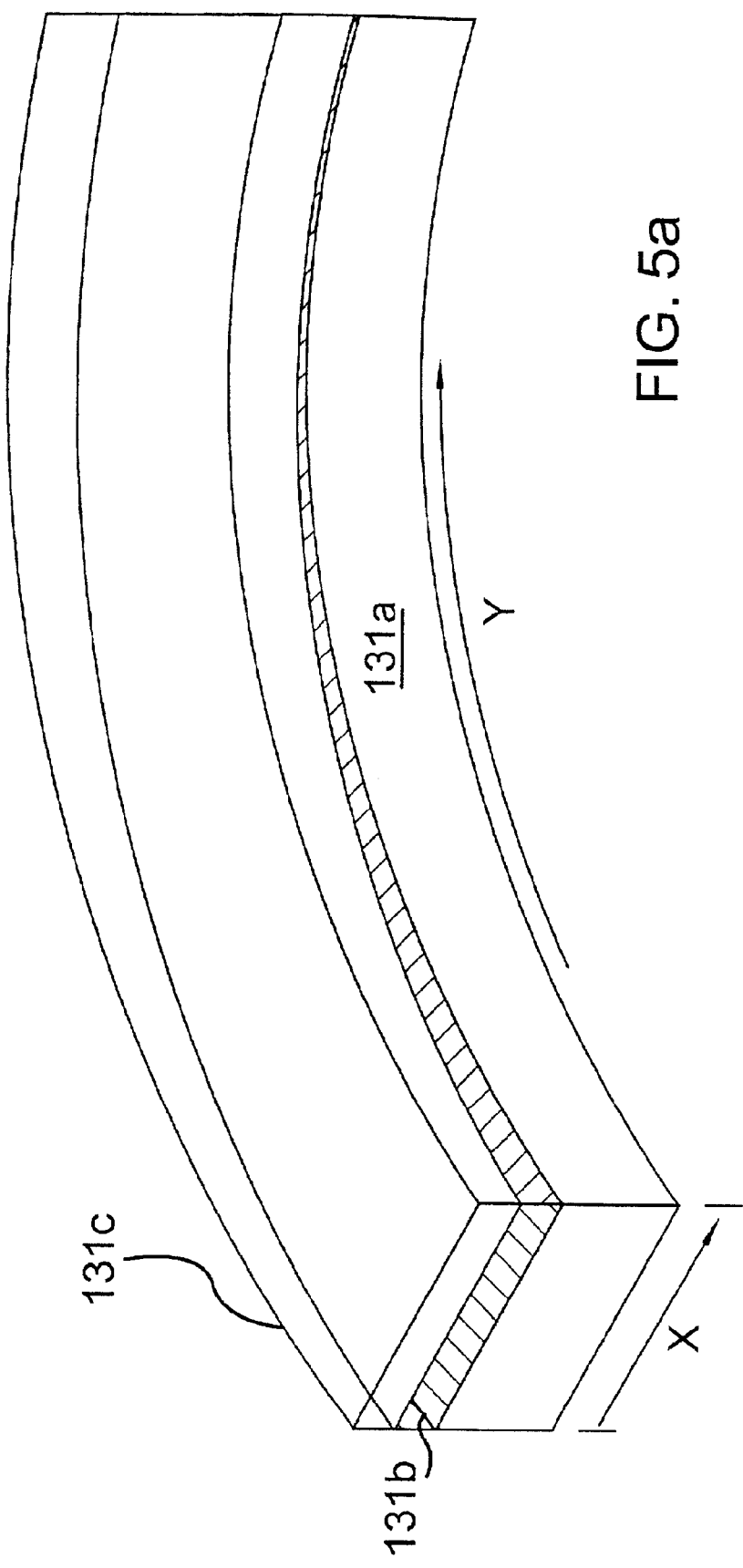

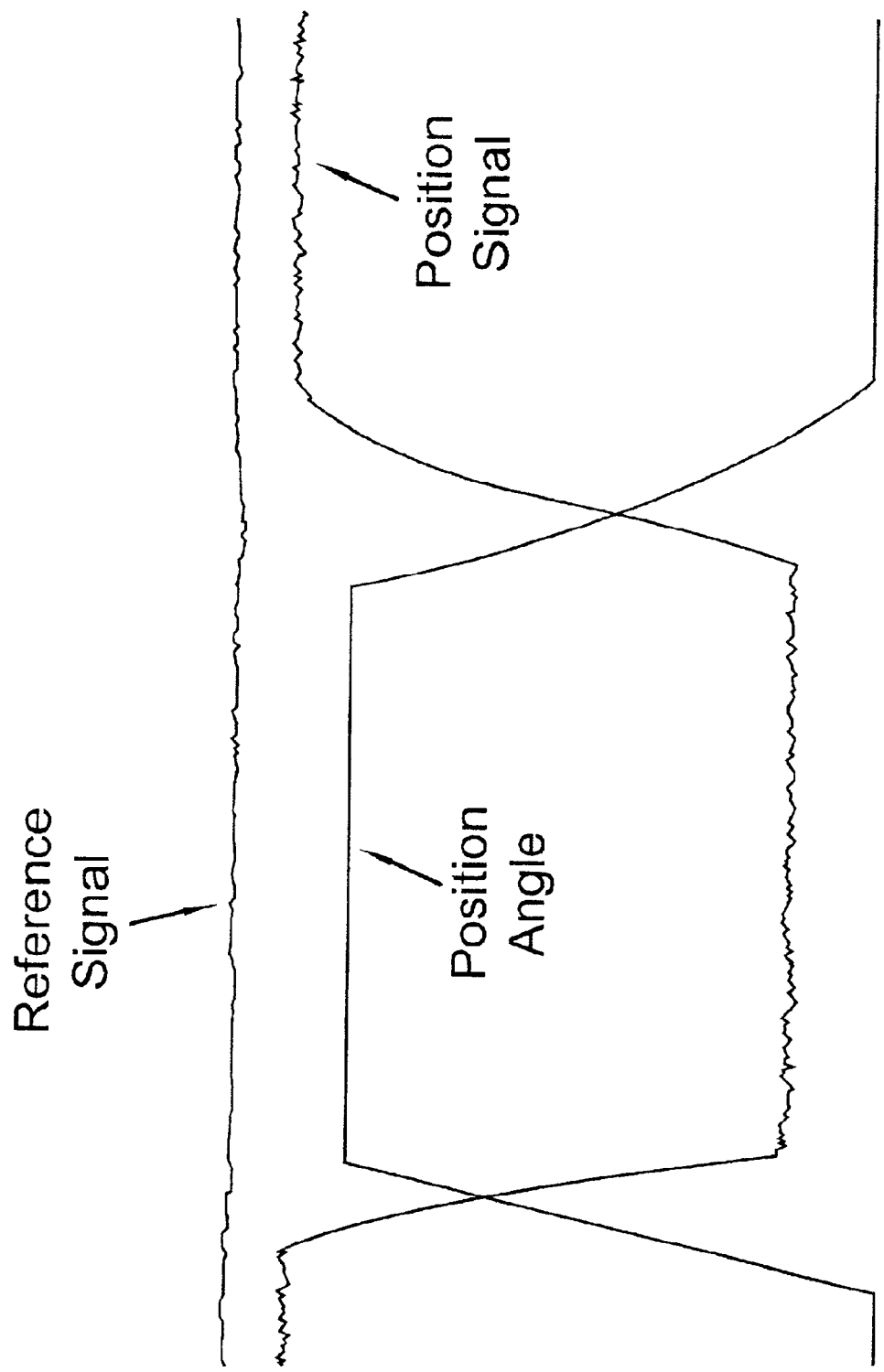

OPTICAL SENSOR METHOD, SYSTEM AND APPARATUS

FIELD OF INVENTION

The present invention generally relates to sensors, and more particularly, to valves with optical sensors configured to obtain and process sensed position information while operating in volatile environments, such as in aircraft or the like.

BACKGROUND OF THE INVENTION

Sensors are used in a number of applications for various reasons. Sensors used in valve system applications, for example, may be designed to determine whether the valve is in an open or closed position (e.g., polarity). Such sensors, and any corresponding circuitry, are typically placed immediately adjacent to the item being sensed. Exemplary sensors used in various applications are disclosed in U.S. Pat. Nos. 4,356,397, 4,931,635, 5,029,967, 5,087,811, 5,343,736, 6,073,650, and 6,118,539.

For example, one conventional valve assembly may include a seal plate assembly, or gate, within a valve duct or fluid passage. The seal plate may be pivotally disposed within the valve duct and may have an outer periphery that conforms with an internal wall of the duct. The seal plate may move or otherwise operate between a first position (e.g., closed) and a second position (e.g., open) within the duct to control the fluid flow. In the first position, the seal plate may be positioned to block the flow path of a gas or liquid by substantially engaging the duct wall in a sealing fashion to close fluid flow in the duct. In the second position, the seal plate is positioned to be less obstructive or generally parallel to the flow path to allow fluid flow in the duct. Exemplary valves, such as for example, a solenoid valve, a butterfly valve, a spool valve, a pilot valve, a bleed valve, a check valve and similar apparatus having one or more flow modulating elements for gas, liquid or other matter, are also shown in U.S. Pat. Nos. 4,428,194, 4,445,532, 4,458,718, 4,768,555, 4,964,422, 4,964,431, 4,967,778, 5,000,213, 5,005,804, 5,029,599, 5,102,097, 5,113,910 and 5,351,934.

Some sensors require electrical circuitry to operate. In some valve assemblies, such sensors may not operate due to certain hostile, harsh or highly volatile environments such as, for example, high temperature environments and/or high vibration environments. These types of environments might exist, for example, in a valve assembly operating on an aircraft turbine engine system or a valve assembly operating in an aircraft environmental control system. In such harsh environments, it is difficult to electronically monitor the position of any moveable component within a valve or other flow modulating element. These types of environments may severely damage a sensor's electrical circuitry due to the high temperature, vibration and/or other harsh characteristics. Moreover, some sensors (such as that shown in U.S. Pat. No. 4,356,397) are designed to provide only complete position polarity information (e.g., valve open or closed, valve on or off; valve high or low; etc.) and fail to provide any indication of the valve's partial or modulated operation (e.g., partially open or closed) and the extent of such partial or modulated operation (e.g., angular or linear displacement).

In view of the foregoing, there is a need for an improved, more robust sensor to detect linear and/or rotational operational characteristics of a valve element (such as, for example a seal plate within a valve assembly) which is operating in various extreme environments, such as a high temperature environment, a high vibration environment and/or like harsh environments. The present invention satisfies this need.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects and embodiments of the invention can be gained from the entire specification, claims, drawings, and abstract taken as a whole.

By way of example only, one aspect of the present invention is an optical sensor system and method for determining the position, displacement and/or angle of a member (for example, a seal plate or valve gate) within a system (for example, a valve assembly). Various embodiments of the present system include a controller in communication with an encoder via a fiber optic line or similar light transmitter. The encoder also includes an optically layered element. The element may have a disk shape or any other suitable configuration as required by a particular application. The optically layered element may have at least a first metallic coating having a near linear reflectance as a function of rotation angle or movement, and a second dielectric coating whose optical characteristics allow for setting a predetermined transition point or center wavelength exhibiting a high reflectance to a low reflectance transition within a predetermined spectral width. The controller may be configured to compare a reference light signal with a position light signal to determine position of the disk or plate. The system may further communicate and/or be controlled by a computing system via a data communication network.

In one exemplary embodiment, the present invention is an optical sensor system having at least one actuator cooperating with at least one flow modulating element, at least one rotatable or moveable encoder in communication with the actuator and a controller in communication with each encoder through at least one light transmitter. When the transmitted light signal is emitted from the light transmitter to the encoder, the transmitted signal is received by the encoder and, depending on the status or displacement of the encoder, may be reflected back to the light transmitter for processing by the controller.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate various aspects of the present invention and, together with the detailed description of exemplary embodiments, assists to explain the general principles according to the present invention.

FIG. 5a is a circumferential cross-sectional view of an exemplary encoder disk of the sensor of FIG. 4;

FIG. 6b is a exemplary signal output graph illustrating an optical reference output signal (reflected from the second, or top, coat), a mechanical angular position output signal (corresponding to angular displacement) as well as an optical position output signal (corresponding to positional displacement) reflected from the first, or bottom, coat.

DETAILED DESCRIPTION OF EXEMPLARY EMBODIMENTS

One embodiment of the present invention provides a method and apparatus or system having an improved optical sensor. In this regard, the present system is described herein in terms of block diagrams and various processing steps. It should be appreciated that such functional blocks may be realized by various hardware, firmware, and/or software components configured to perform the specified functions. For example, the present system may employ various circuitry, electronics and software such as microprocessors, microcontrollers, integrated circuit components, memory elements, digital signal processing elements, look-up tables, databases, and the like, which may carry out a variety of functions under the control of one or more processors or other control devices. Such general techniques and components that are known to those skilled in the art are not described in detail herein.

Figure 1A:
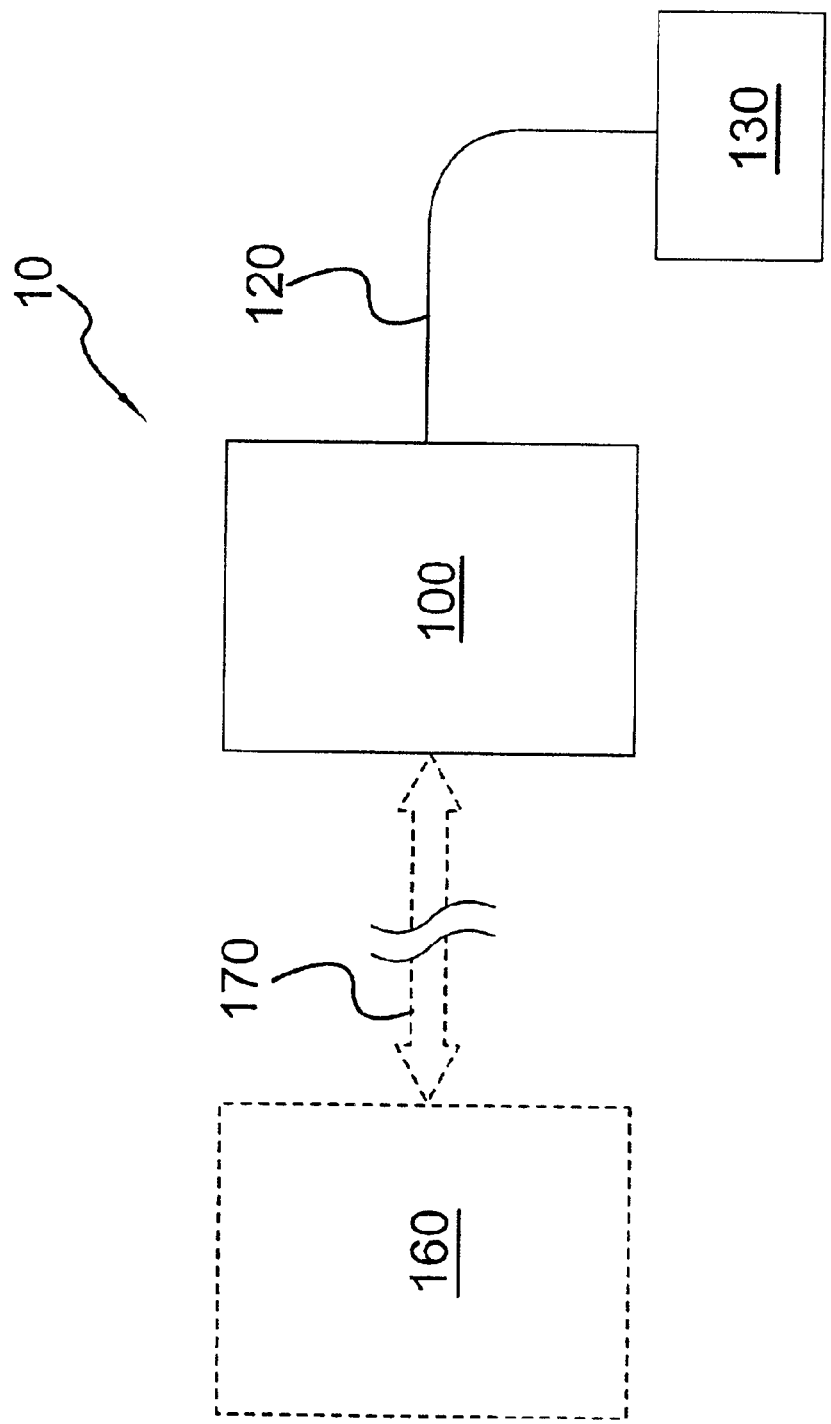
FIG. 1a is a representative block diagram of an optical sensor system as configured for one embodiment according to the present invention.

Referring now to FIG. 1a, one embodiment of the present invention is an optical sensor system 10 responsive to the seal plate position in a valve assembly having a controller 100 in communication with a rotatable or otherwise moveable encoder 130 via a light transmitter 120. Optionally, as seen in FIG. 1a, the optical sensor system 10 may communicate and/or be controlled by a computing system 160 via a data communication network 170.

Figure 1B:
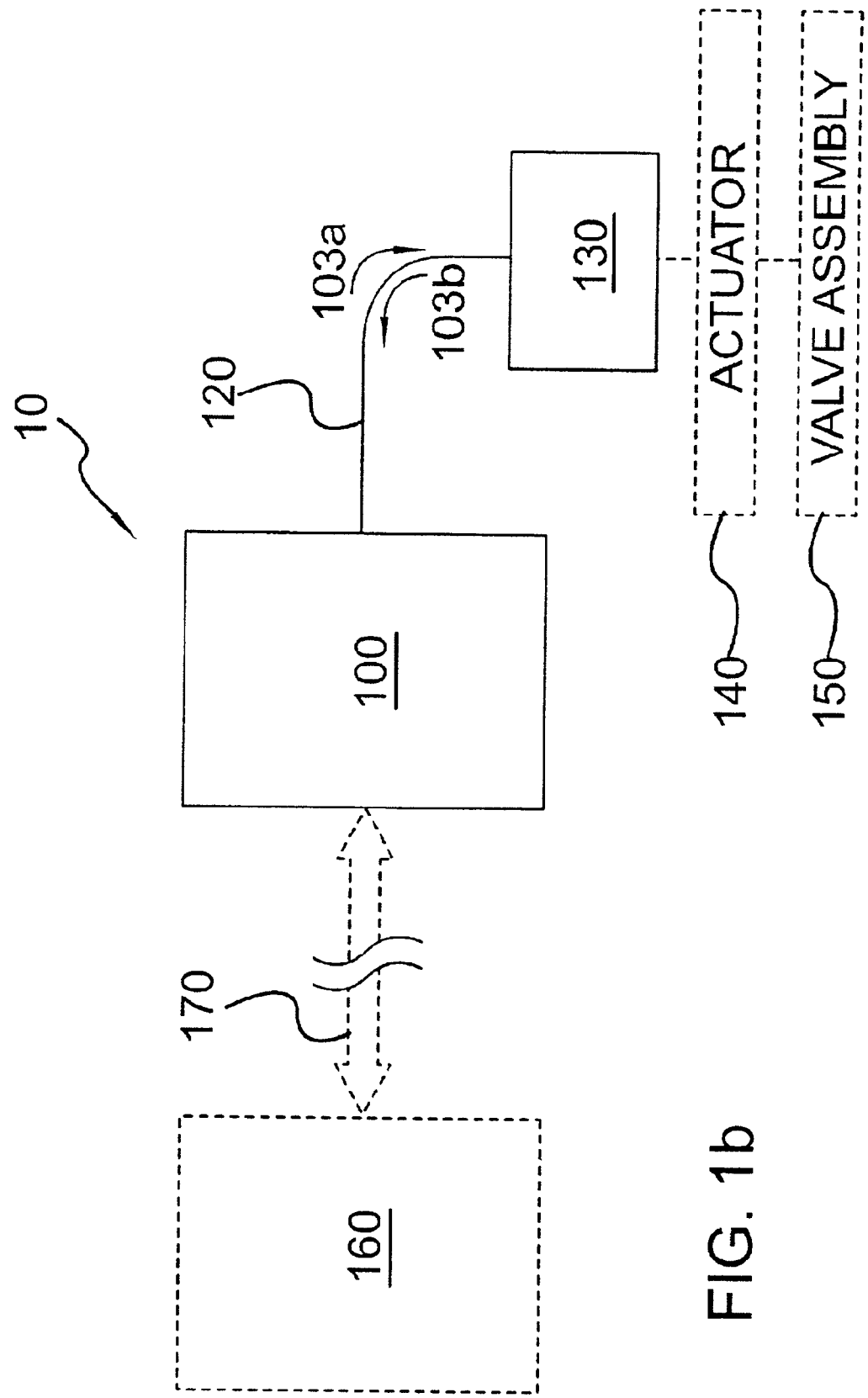
FIG. 1b is another representative block diagram of an optical sensor apparatus or system of FIG. 1a illustrating its application in communication with an actuator and a valve assembly.

In another embodiment as seen in FIG. 1b, the optical sensor system 10 includes at least one actuator 140 cooperating with at least one valve assembly or similar flow modulating element 150 (through, for example, a valve gate seal plate within the valve assembly), at least one rotatable or moveable encoder 130 in communication with the actuator 140, and a controller 100 in communication with each encoder 130 through at least one light transmitter 120.

Figure 3:
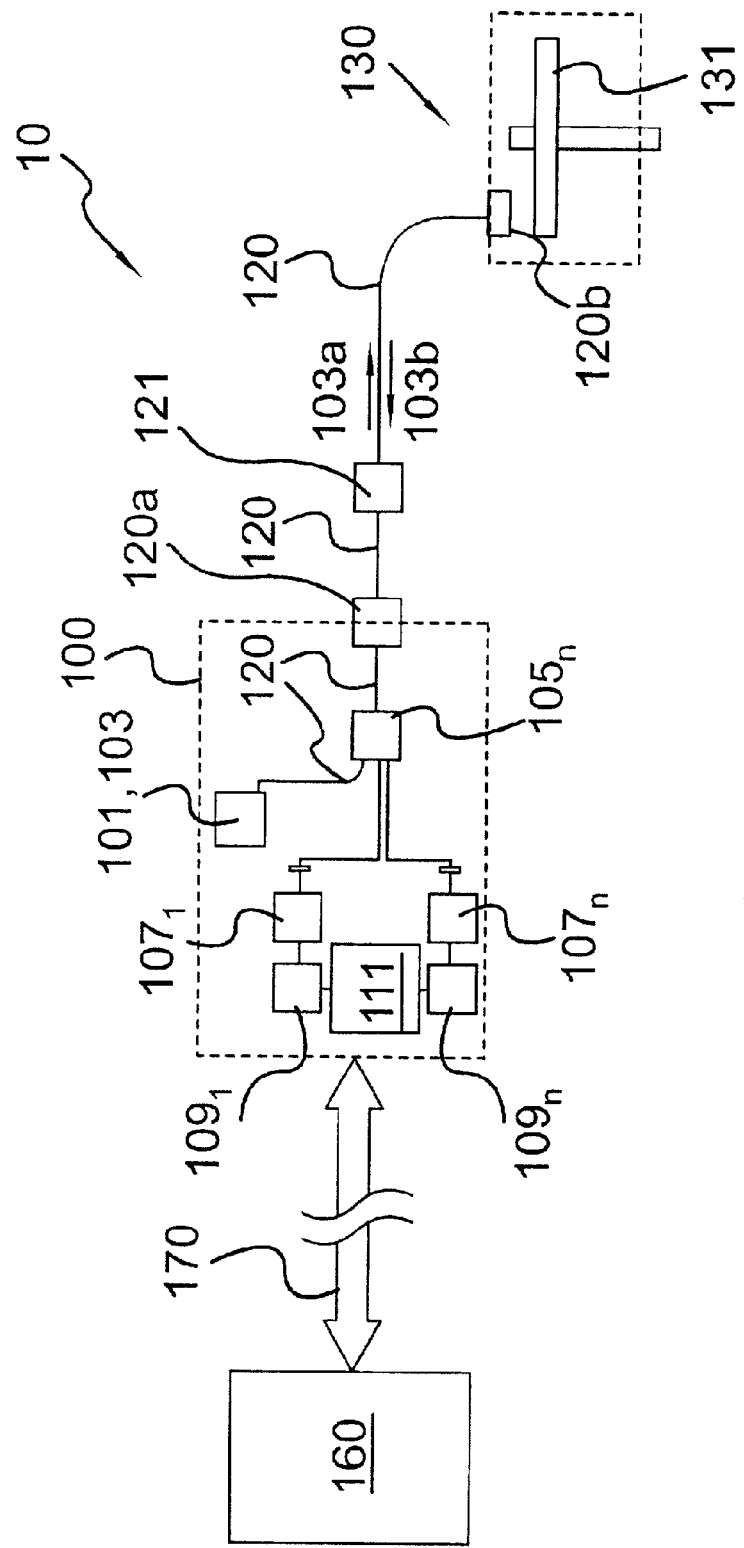
FIG. 3 is another representative block diagram of an optical sensor apparatus or system according to the present invention.

A suitable exemplary light transmitter 120 may include one or more fiber optic cables configured to operate in hostile environments such as, for example, model number AFACB6895 Anhydroguide G assembly AFS100/140G (manufactured by Fiberguide Industries of Sterling, N.J.) which is a 100/140 micrometer core/cladding multimode fiber cable. Moreover, this particular type of light transmitter is useful because it is easy to connect, has high coupling efficiency and is relatively inexpensive. The ends or tips found on this particular fiber optic cable also do not typically contain any significant amounts of undesirable compounds, such as epoxies, and thus, is suitable to maintain good coupling efficiencies with low scatter during high temperature operation. While the term "light transmitter" may appear in the singular tense, those of skill in the art will appreciate that the entire light transmitter 120, and even including various portions of the light transmitter $120_n$ (where n=1, 2, . . . n), may be partitioned into separate units yet be appropriately coupled together (such as, by optical coupler 121 as illustrated in FIG. 3) in order to operate in different environments such as different temperature ranges, including temperatures in excess of 450° Celsius and including temperatures of at least up to 650° Celsius. Therefore, the term "light transmitter" as used herein may also encompass the plural tense.

Figure 2:
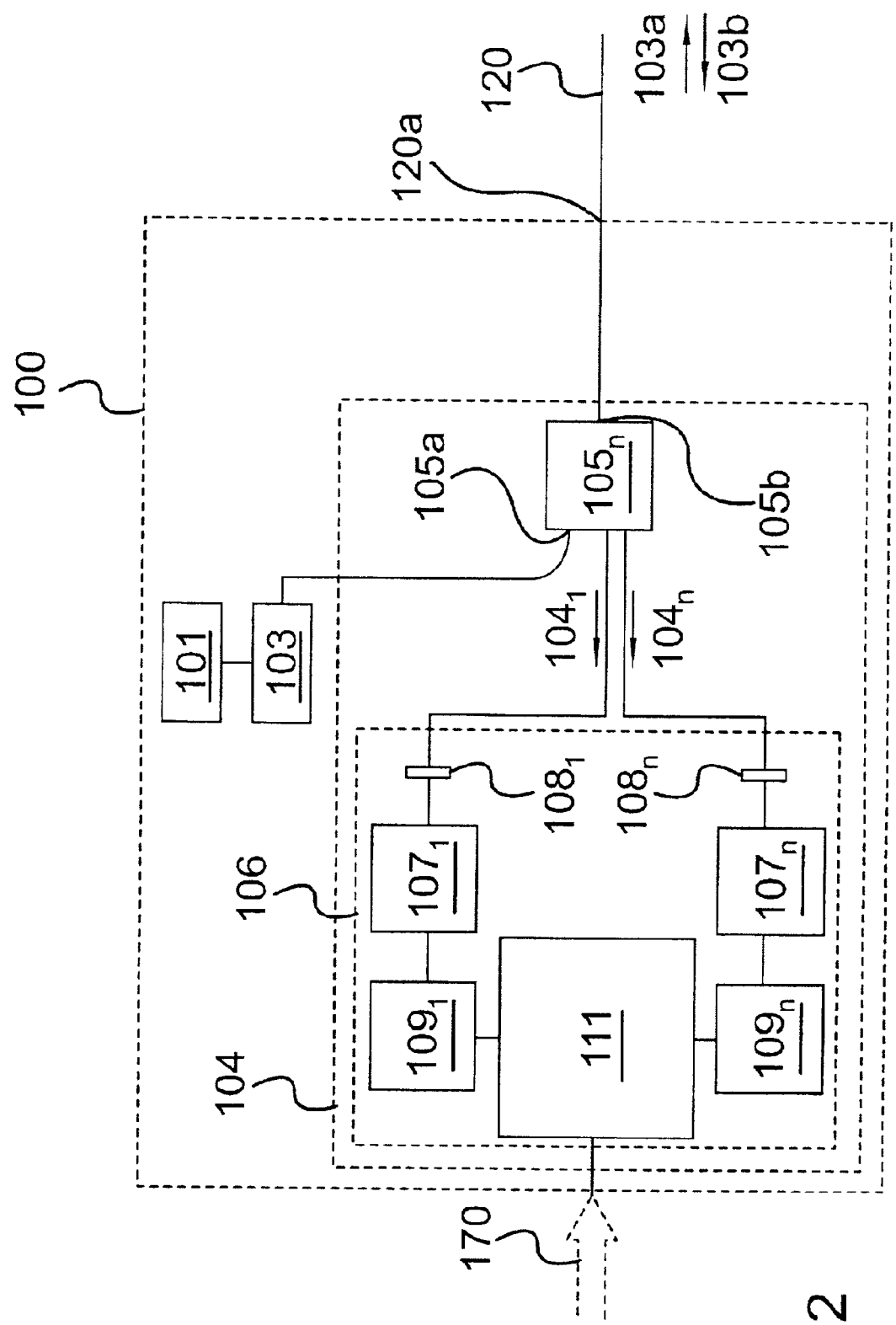
FIG. 2 is a representative block diagram of an exemplary controller according to the present invention.

As seen in FIG. 2, controller 100 may include a number of components designed to transmit and obtain light signals. A suitable controller 100 may include an astable multivibrator circuit 101 which communicates with and controls light source 103 to modulate an electrical current through light source 103 in order to generate at least one light signal for transmission to encoder 130 (FIG. 1b) via light transmitter 120 (the transmitted light signal being identified generally by arrow 103a). Light source 103 is preferably a high efficiency wideband light emitting diode (LED), and in one embodiment, is center-configured at approximately 820 nanometers (nm) with a spectral width of approximately 100 nm. A suitable exemplary light source, for example, may be part number 80-0821 manufactured by General Fiber Optics, Inc. The approximate or exact light modulation frequency of the light source 103 may be chosen or predetermined to match the requirements of any particular application and yet, still remain within the scope of the present invention.

Figure 4:
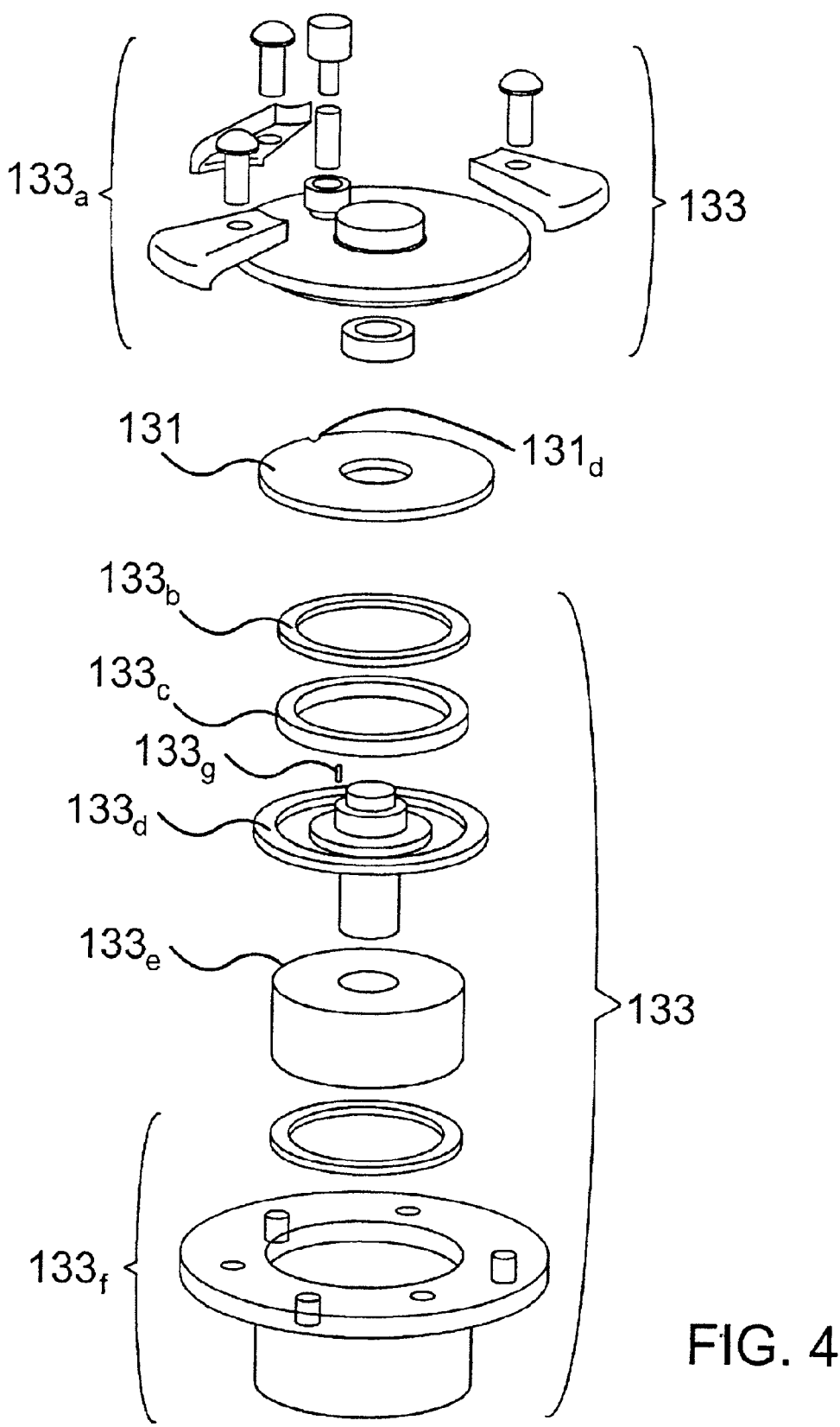
FIG. 4 is a representative block diagram of an exemplary encoder and housing from the encoder 130 of FIG. 3.

Light transmitter 120 may be implemented with any type of optical fiber or other optical medium. As illustrated in FIG. 3, when the transmitted light signal 103a is emitted from second end 120*b* of light transmitter 120, the transmitted signal is received by encoder 130. Encoder 130 suitably includes a disk, plate or similar movable substrate 131 that moves with respect to a housing 133 (FIG. 4). As discussed more fully below, substrate 131 includes a reflective coating that varies across the surface of the substrate such that light reflected back to transmitter 120 from substrate 131 is suitably dependent upon the status or displacement of substrate 131. Because the light signal emitted from second end 120*b* is suitably emitted at a broad angle, the transmitted light signal's intensity reduces very quickly with distance from the fiber end 120*b*. End 120*b* may therefore be positioned about 0.002 inches from substrate 131 to provide effective light transmission between fiber 120 and substrate 131.

As is known in the art, at least one optical light splitter may be configured to receive at least one light signal and to transmit at least one light signal. Thus, returning to FIG. 2, controller 100 further includes a light splitter $105_n$ which receives a light signal from light source 103 at a first end 105*a* and transmits light 103*a* to encoder 130 through light transmitter 120 at a second end 105*b*. While optical splitter $105_n$ is depicted as a single item in FIG. 2, those of skill in the art will realize that multiple optical splitters (e.g., where n=1, 2, . . . n) may be optically coupled together to achieve the desired operation. Moreover, it should be appreciated that the light transmitter 120 may couple to the controller 100, the encoder 130 or to other portions of the light transmitter 120 by any conventional means or connection, including through, for example, a SMA bulkhead fitting, at a first end of light transmitter 120*a*. Other types of connectors for multimode fiber optic cables are available, including FC, ST and SC connectors.

When a light splitter (such as, for example, light splitter $105_n$ in FIG. 2) is used to split an optical signal, some amount of signal loss will inherently occur between the light signal received and the light signals which are split. Further, there is a relative amount of inefficiency that occurs when a light signal is transmitted over a light transmitter (e.g., such as transmitted light signal 103*a* transmitted over light transmitter 120 in FIG. 1). Because of these factors, any signal transmitted through the optical splitter $105_n$ will likely be small or reduced in optical signal strength. In order to compensate for the optically-reduced split signals $104_{1-n}$, light detection circuit 104 may be configured to detect the optically reduced signal 103*b* with sufficient accuracy by using a phase sensitive detection circuit 106. Thus, in one embodiment as seen in FIG. 2, phase sensitive detection circuit 106 may include at least one processing circuit 111 in communication with the optical light splitter $105_n$ through at least a first and second photodiode $109_1$, $109_n$ (where n=1, 2, . . . n), and at least a first and second bandpass filter $107_1$, $107_n$ (where n=1, 2, . . . n). Processing circuit 111 is any digital and/or analog circuit capable of measuring the output from photodiodes $109_{1-n}$ and providing an appropriate output for sensor 100. Accordingly, processing circuit 111 may be implemented with conventional analog circuitry, as described more fully below. Alternatively, processing circuit 111 may include a digital controller (such as a microprocessor, microcontroller, digital signal processor, or the like) receiving data from photodiodes $109_{1-n}$ via a conventional analog-to-digital converter. Optionally, processing circuit 111 may further include a digital interface to communicate with computing system 160 (FIG. 1*b*) via a data communication network 170 (FIG. 1*b*).

One of the advantages of utilizing a phase-sensitive detection circuit 106 is that light signal amplification may be accomplished by using alternating current (AC) amplifiers, which substantially reduces errors caused by baseline drift of the amplifiers. In this regard, filters $107_{1-n}$ increase the signal to noise ratio to obtain the maximum amount of light detectable. Other filter designs could be employed (such as, for example, long and short pass filters), but such designs may affect other aspects of the present invention (e.g., such designs may change the light source characteristics that are likely to manifest themselves in changes at the spectral edges). In any event, the filter design should be configured to obtain as close to the dielectric coating transition edge as possible because this is the point where the light source output is at a maximum level. In the present embodiment, a bandpass filter is used because it is relatively inexpensive and because it exhibits sharp spectral characteristics (e.g., 4+ resonant cavities) as well as high transmission within the spectral band. The spectral width is thus configured to accept more light. Furthermore, as seen in FIG. 2, one or more filters $107_n$ may be utilized to increase the signal-to-noise ratio of the light signal received by the detection circuit 106.

Thus, in one embodiment, a suitable representative light splitter $105_n$ may include part number MM 100/140 850 nm 1×3 splitter with a 50:25:25 output ratio commercially sold by Metrotek Industries. Similarly, a suitable representative filter $107_n$ may include part numbers 33-8830-00 CWL 780 FWHM 30 and 33-8947-000 CWL 855 FWHM 40, manufactured by Coherent of Auburn, Calif. A suitable representative photodiode $109_n$ may include part number FND100 manufactured by EG&G.

In various embodiments such as the one shown in FIG. 3, a digital computer 160 is used to control sensor system 10 and/or to receive feedback from controller 100 regarding the position or status of valve actuator 140 (FIG. 1*b*). In such embodiments, computer 160 communicates with controller 100 via any conventional network 160 using any network topology, scheme and/or protocol. Network 160 may be an ETHERNET network, for example, or may be any type of wired, wireless or optical network.

Turning to FIG. 4, encoder 130 may comprise, in one embodiment, a substrate, plate or disk 131 within a suitable housing structure 133. Disk 131 is configured to communicate with or otherwise cooperate with the element being sensed, such as a valve plate in a valve assembly, through conventional means such as by a shaft or like link. As such, as the element being sensed operates (e.g., by either rotational or linear displacement), disk 131 correspondingly tracks the operation of the element (e.g., by either rotational or linear displacement as dictated by the type of assembly being sensed). While the term "disk" may generally refer to a circular and/or rotatable object, the substrate, plate or disk may be configured as a circular object or a non-circular object (for sensor rotatable or linear movement, respectively), depending on the particular application.

Housing structure 133 may be designed by any conventional method to retain disk or plate 131, and further, to operate in harsh environments. An exemplary housing structure 133 is illustrated in FIG. 4. In this embodiment, housing structure 133 may include a plurality of components, including an upper housing 133*a,* a spring washer 133*b,* at least one shim 133*c,* a rotatable disk support 133*d* in communication with the seal plate, at least one bearing 133*e* and a lower housing 133*f,* each component cooperating to appropriately retain disk or plate 131 as it rotates or otherwise moves. Upper housing 133*a* may further be appropriately configured to receive and retain the light transmitter second end 120*b* so that it maintains a set distance from disk 131. Moreover, because the disk 131 may have smooth upper or lower surfaces, it may further be configured with a small notch, indent or port 131*d* configured to receive a pin 133*g* coupled to disc support 133*d*. In this regard, as the seal plate in the valve assembly 150 moves, the disk support correspondingly also moves as does disk 131.

A circumferential cross-sectional view of an exemplary disk or substrate 131 is illustrated in FIG. 5*a*. Substrate 131 may comprise a substructure 131*a* having at least a first coating 131*b* partially applied to one surface of the substrate, and at least a second coating 131*c* wholly applied to the first coating 131*b*. The substructure 131*a* may be of any conventional glass material, such as for example, fused silica or a similar aluminosilicate material whose thermal expansion coefficients are approximately matched for the dielectric dichroic coatings that are deposited on top of the substrate. The substructure 131*a* may be made of any glass that does not deform at high operational temperatures and further and that has good environmental characteristics such as inertness to oxidation.

The first coating 131*b* may be a variable metal coating (such as, for example, an inconel coating) which is, in one embodiment, gradiently applied to the glass substrate 131*a*. Thus, in one embodiment as illustrated in FIG. 5*a*, the metal coating may be applied such that in a radial direction, the thickness remains approximately the same (e.g., arrow X), while in the circumferential direction (e.g., arrow Y), the thickness is reduced. In turn, the second coating 131*c* is preferably a dielectric dichroic coating. The angle or distance covered by the layers is typically larger than the required angle or distance to account for deposition tolerances. Thus, in one embodiment, the metal layer may have a reflectance that ranges from approximately 0 to 60 percent, which equates to approximately between 0 and 90 degrees angular rotation. Moreover, the metal layer 131*b* should possess good adherence properties to both glass and any overlaying dielectric layers 131*c*, as well as good and flat reflectance profiles at the emission wavelength of the light source 103 (such as, for example, an Edmund Scientific circular ND filter with a 1 inch diameter and an optical density of 0–2; part number F43760).

The dielectric dichroic coating may be any suitable coating which allows for setting a predetermined transition point or like center wavelength exhibiting a high reflectance to a low reflectance transition in as few nanometers as possible. In other words, the coating may suitably be selected to exhibit a reflective characteristic when light wavelengths below the transition point are reflected off of the dichroic coating (e.g., it reflects light wavelengths which are below the transition point, and may be regarded as being similar to a mirror). Likewise, the coating may suitably be selected to exhibit a transparent characteristic when light wavelengths above the transition point are reflected off of the dielectric dichroic coating (e.g., it passes light wavelengths through the dichroic material which are above the transition point). These properties are illustrated in FIG. 5*f*. As a broadband light signal 103*a* is transmitted from light transmitter end 120*b*, half of the light spectrum if reflected off the second coating 131*c* thereby generating a reference light signal. The other half of the light spectrum passes through second coating 131*c* to first coating 131*c*. Because the disk 131 variably reflects light signals based on its position, the light signal 103*b* reflected off the substrate 131*a* and 131*b* is an amplitude modulated position signal. Thus, as seen in FIG. 6*b*, a reference light signal and a position light signal will always be reflected back to the light transmitter second end 120*b* for processing by controller 100.

Additionally, the dielectric dichroic coating 131*c* should also have good adherence properties to coating 131*b*, as well as possessing the desired reflectance properties. With regard to any layers employed, the layers are inert to the atmospheric conditions in high temperature environments and are able to withstand mechanical stresses during thermal cycling and/or thermal expansion.

Thus, in one exemplary embodiment of the present invention, the dielectric dichroic coating 131*c* may be determined to have a transition point of approximately 825 nanometers so that it has a high reflectance at wavelengths less than 800 nanometers and is nearly transparent in wavelengths more than 840 nanometers. In this regard, a suitable dichroic coating may suitably be chosen based on the application. One suitable dichroic coating is provided by Barr Associates, Inc. of Westford, Mass.

Figure 5B:
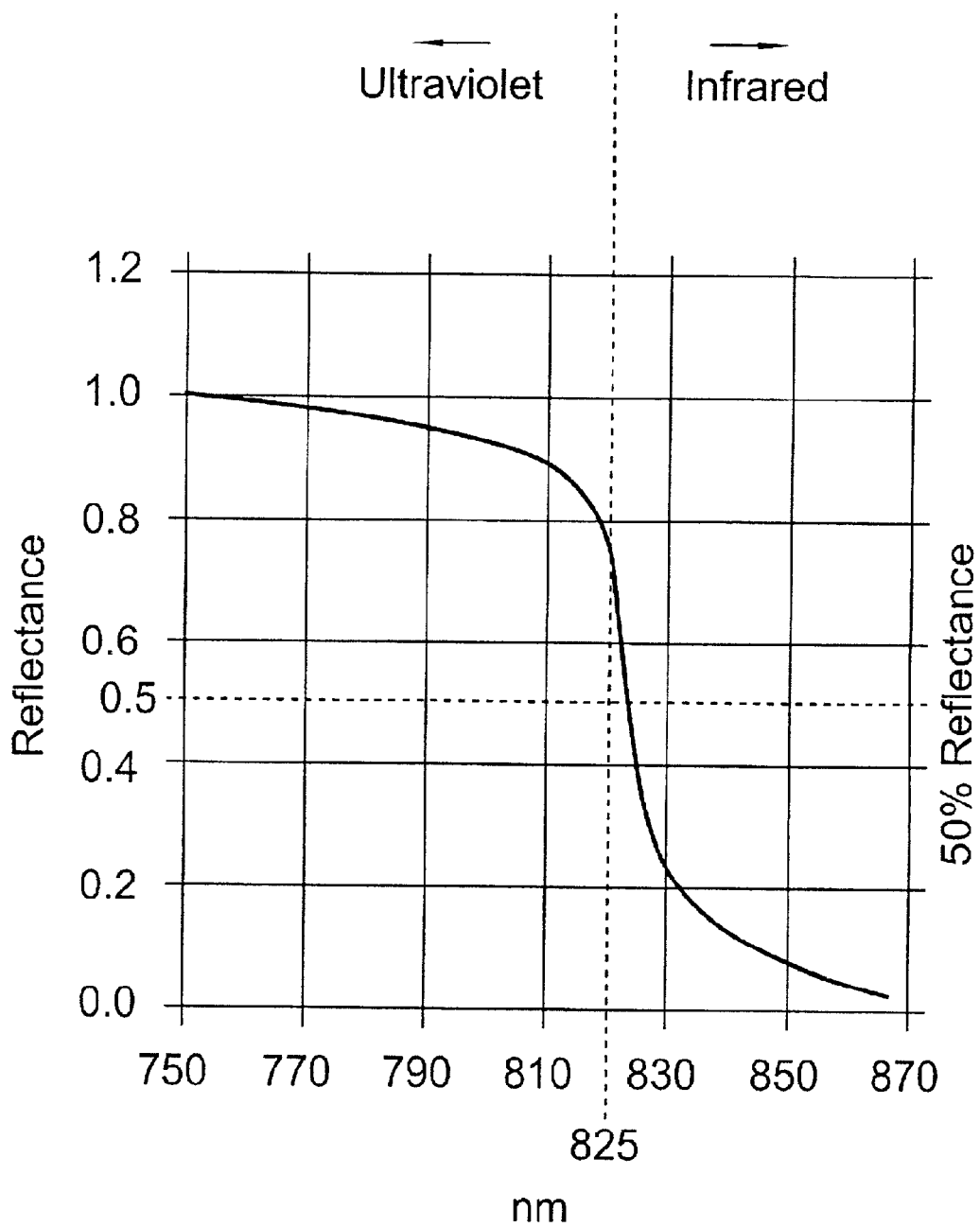
FIG. 5b illustrates a reflectance curve for a dichroic material having a center wavelength of approximately 825 nanometers.

FIG. 5*b* illustrates an exemplary reflectance curve for a dielectric dichroic coating having a predetermined transition point of 825 nanometers. As can be seen, the dielectric dichroic coating will primarily reflect light below 825 nm and primarily transmit light above 825 nm. For wavelengths of light below 825 nm where the dielectric coating reflectivity is near unity, the light primarily reflects off of the dielectric coating before it reaches the metallic coating layer. For wavelengths primarily above 825 nm, the dielectric coating is primarily transmitting the light through to the metallic coating layer below. The light reflected back is thus primarily due to the reflectance of the metallic coating layer. If the metallic coating layer thickness is varied in rotation angle, the amount reflected from the surface will vary with that angle. In this regard, it is now possible to "read" or otherwise obtain the rotation angle of the disk 131 by looking up (such as, for example, by a look up table implemented in software) the ratio of the light reflected above 825 nm to the light reflected below 825 nm after calibrating the system.

Figure 5C:
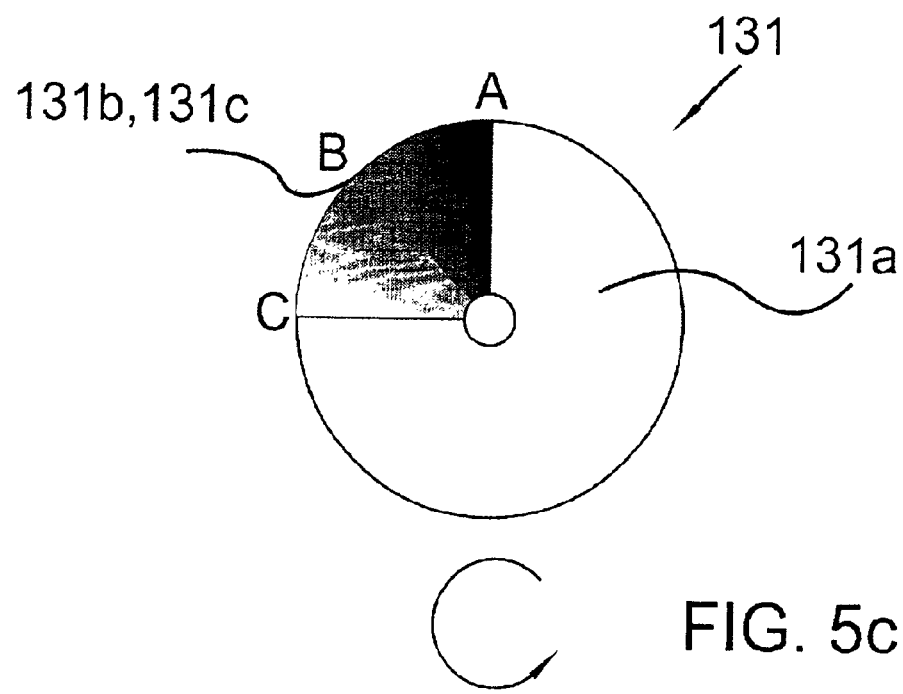
FIG. 5c illustrates a rotatable surface of the exemplary disk of FIG. 5a having a quarter-circular metallic layer with a reflectivity varying from a minimum to a maximum between approximately 0 and 90 degrees and being fully covered by a dichroic dielectric thin film coating.

The present sensor can be suitably configured to sense any number of angular or linear displacements. For example, FIG. 5*c* illustrates a disk 131 configured to sense angular displacement between approximately 0 and 90 degrees. In particular, FIG. 5*c* illustrates a disk or glass substructure 131*a* having at least a first metallic coating 131*b* applied to one surface of the substrate in a gradient fashion with a range of approximately between 0 and 90 degrees, and at least a second coating 131*c* applied over the metallic coating 131*b*.

Figure 5D:
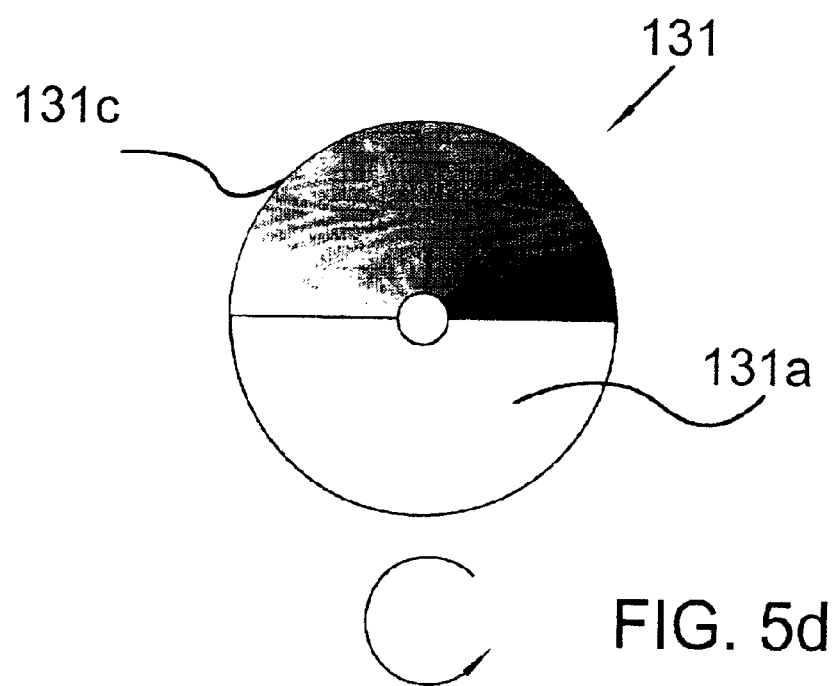
FIG. 5d illustrates a rotatable surface of an exemplary disk of FIG. 5a having a semi-circular metallic layer with a reflectivity varying from a minimum to a maximum between approximately 0 and 180 degrees and being fully covered by a dichroic dielectric thin film coating.

Similarly, FIG. 5*d* illustrates another embodiment of a disk or glass substructure 131*a* having at least a first metallic coating 131*b* applied to one surface of the substrate in a gradient manner as a function of rotation, and at least a second dielectric coating 131*c* wholly applied to the first coating 131*b*. As those of skill will realize, any angular displacement from approximately 0 to 360 degrees can be measured by appropriate placement or deposition of the metallic coating 131*b*.

Figure 5E:
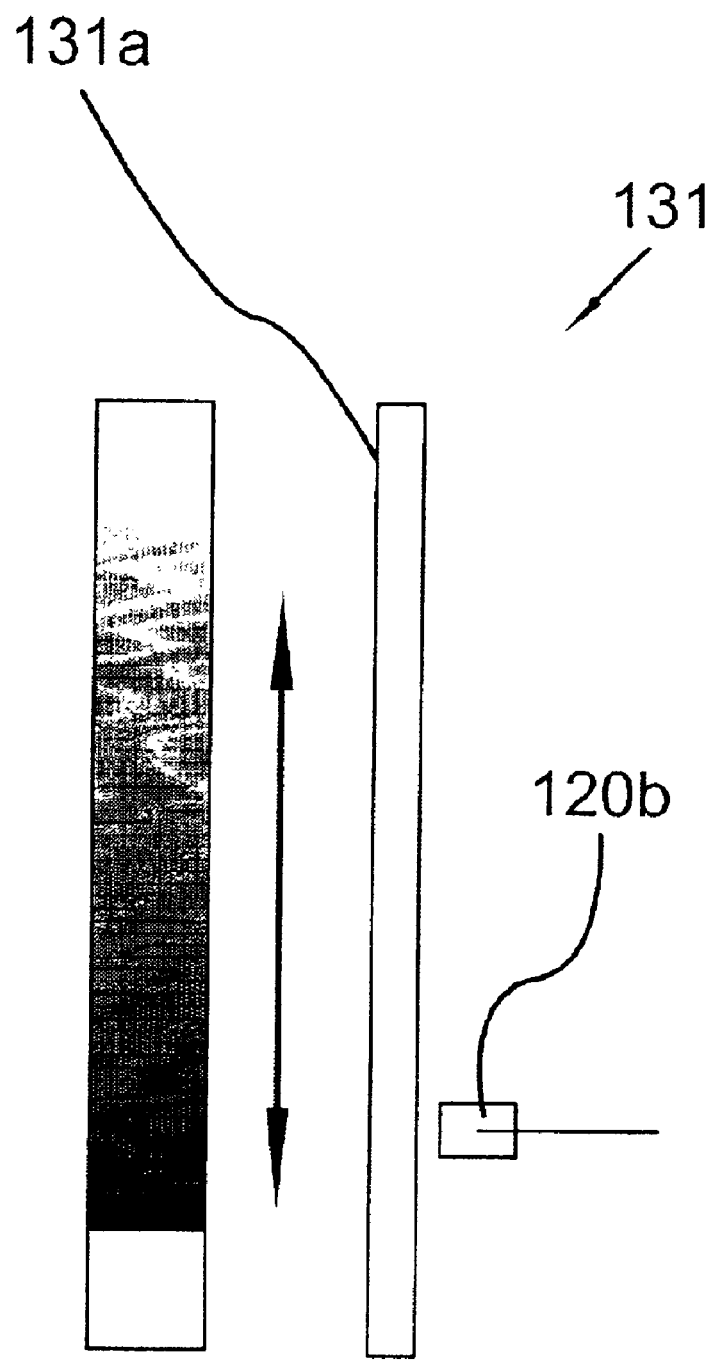
FIG. 5e illustrates a surface of an exemplary plate or lengthwise member having a linear dichroic coating applied over a length of the plate.
Figure 5F:
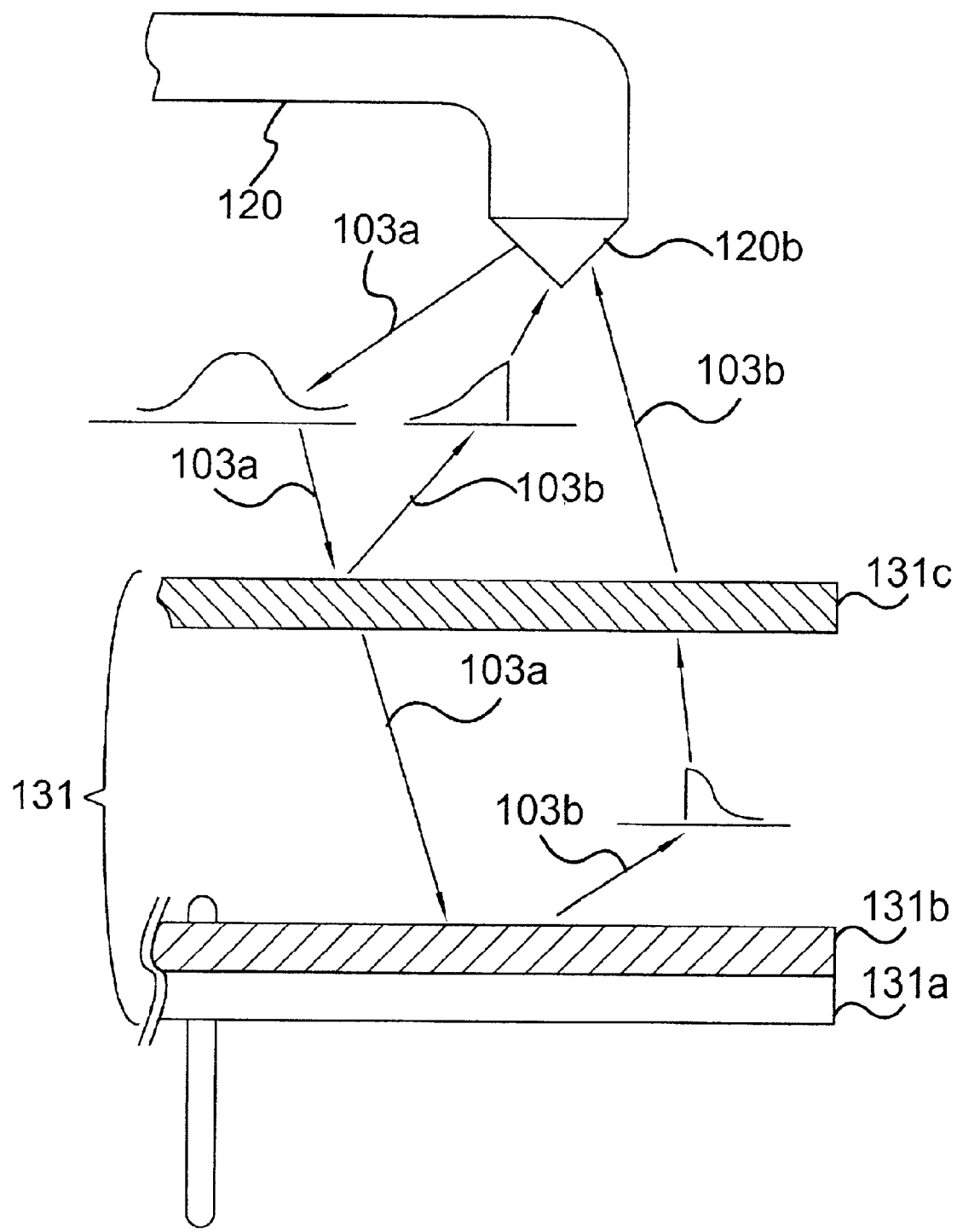
FIG. 5f is an exaggerated view of an exemplary light transmitter adjacent to an encoder of the present invention, the encoder having two coats, the Figure illustrating an exemplary flow of light from the light transmitter, through the disk second coating (or, top coat), some light partially reflecting off the disk first coating (or, bottom coat) and returning to the light transmitter, and some light partially reflecting off the disk second coating and returning to the light transmitter.

Moreover, as illustrated in FIG. 5*e*, a plate 131 or like linear structure is configured to sense linear displacement over a specified distance. In particular, FIG. 5*e* illustrates a glass substructure 131*a* having at least a first gradient metallic coating 131*b* applied to one surface of the substrate and whose thickness varies along the length of the substrate, and at least a second dielectric dichroic coating 131*c* applied to the first coating 131*b*. Those of skill in the art will realize that the present sensor can easily be appropriately modified to allow sensor between 0 and 360 degrees (if used to sense angular displacement) or by any unit length (if used to sense linear displacement).

The present invention may have embodiments that include a method, an optical sensor system, an apparatus for sensor valve assemblies and/or a computer program product. Furthermore, the present sensor may include a computer program product on a computer-readable storage medium having computer-readable program code embodied in the storage medium. Any suitable computer-readable storage medium may be utilized, including hard disks, CD-ROM, optical storage devices, magnetic storage devices, and/or the like.

Figure 6A:
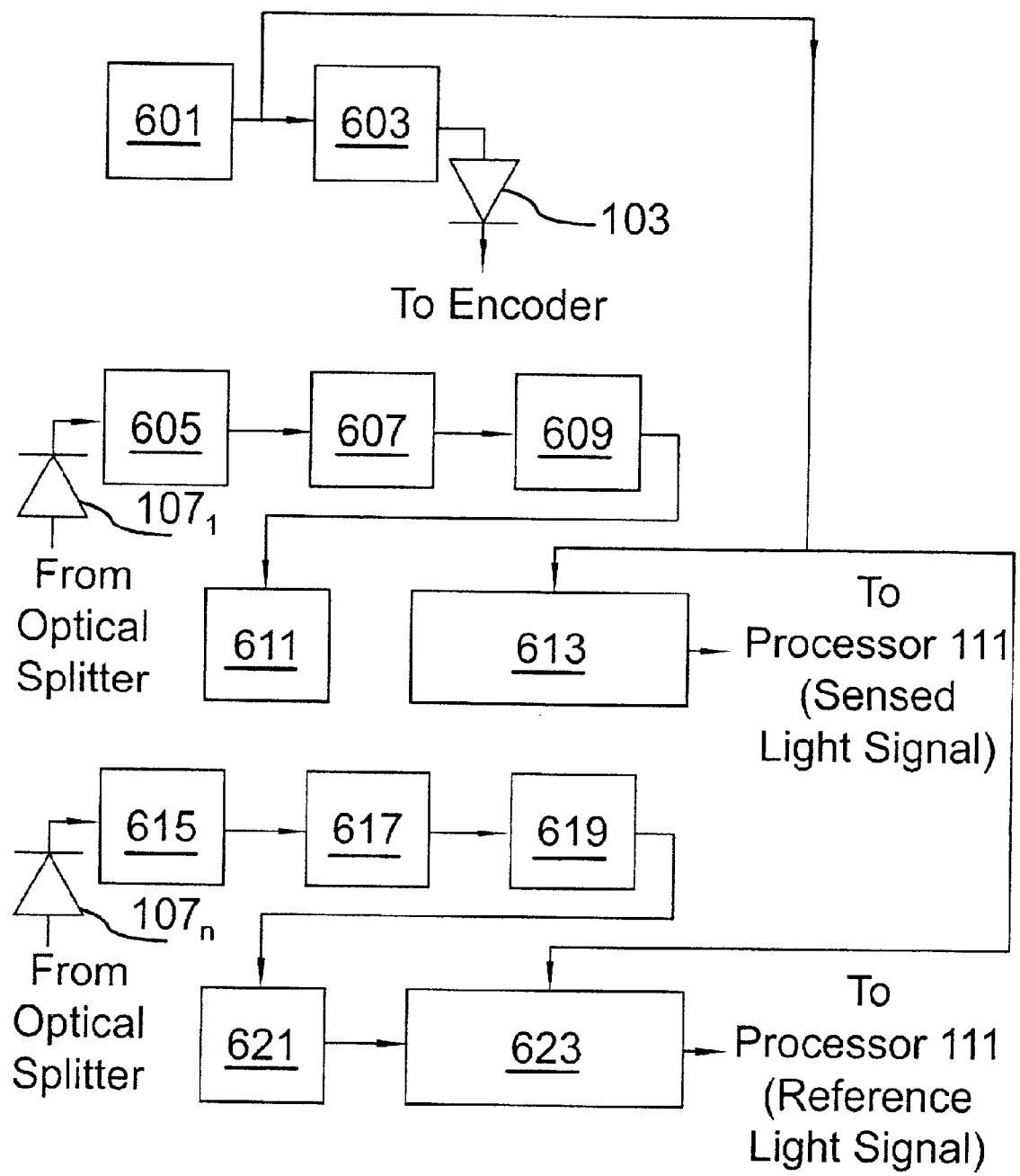
FIG. 6a is a representative block diagram of a phase sensitive detection process as configured for one embodiment of the present invention.

In accordance with one operational embodiment of the sensor as seen in FIGS. 2, 3 and 6a, circuit 101 controls light source 103 to generate a light signal center-configured at approximately 825 nanometers (nm) with a spectral width of approximately 100 nm and a modulation frequency of 1 Kilohertz. This signal is sent to optical splitter $105_n$, and thus, to light transmitter 120. When the light is received by encoder 130, a reference light signal and a position light signal will be reflected back to the light transmitter depending on the position of the disk 131 within encoder 130 (which is indicative of the seal plate position). Thus, if the disk's 131 thicker metallic layer section of the gradient metallic coating is in a position near the light transmitter 120 (point A as seen in FIG. 5c, indicating that the disk's dichroic coating 131c is adjacent to the light transmitter second end 120a), a relatively strong light signal having a wavelength of less than approximately 800 nanometers will be reflected off the disk surface's dielectric dichroic layer and back to the light transmitter second end 102a, while light above 825 nm will be transmitted through the dielectric dichroic layer to the thicker metallic layer below to reflect a greater portion of light.

If the disk's 131 moderately reflective surface is in a position near the light transmitter 120 (point B in FIG. 5c), all light having a wavelength of less than approximately 800 nanometers will be reflected off the disk surface's dielectric dichroic layer and back to the light transmitter second end 102a, while light over 825 nm will be transmitted through the dielectric dichroic layer to the thinner metallic layer below to reflect less light.

If the disk's 131 lightly metallic reflective surface is in a position near the light transmitter 120 (point C in FIG. 5c), a relatively small or no light signal having a wavelength of less than approximately 800 nanometers will be reflected off the disk surface, and rather, the majority of any reflected light signal will exist due to the reflectance characteristic of the metal layer 131b.

Both the reflected reference light signal and the reflected position light signals will be transmitted back to optical splitter $105_n$. Thus, the light signal received by optical splitter $105_n$ may be light that was reflected off the dichroic coating 131c, reflected off the metal coating 131b, or a combination of both.

After the light signal is received by the optical splitter $105_n$ as seen in FIG. 2, optical splitter $105_n$ splits the light signal by fifty percent. Fifty percent is an arbitrary number but is used to obtain the best signal to noise ratio. The split light (indicated generally in FIG. 2 by arrows $104_1$, $104_n$) may then be optically collimated by GRIN lenses $108_1$ and $108_n$ prior to transmission to circuit phase-sensitive detection circuit 106. As will be appreciated by those of skill in the art, the light is collimated due to the angular sensitivity of the bandpass filters, and thus, the divergence of the light out of the light transmitter is quite high.

In this example, as seen in FIG. 2, the split light signal $104_1$ may be defined as the reference light signal while the other split light signal $104_n$ may be defined as the position light signal. Both the reference light signal $104_1$ and the position light signal $104_n$ are transmitted to phase sensitive detection circuit 106. In particular, the reference light signal $104_1$ is transmitted to a reference bandpass filter $107_1$ while the position light signal $104_n$ is transmitted to a position bandpass filter $107_n$. In one embodiment, reference bandpass filter is centered at approximately 780 nanometers with a width of 10 nanometers and a central peak transmission of fifty percent. Those of skill in the art will recognize that other filters may be used to collect more of the light signal. Similarly, position bandpass filter $107_n$ is preferably centered at approximately 850 nanometers with a width of 10 nanometers and a central peak transmission of fifty percent. Preferably, both bandpass filters $107_1$ and $107_n$ have widths which maximize the signal to noise ratio and are insensitive to dielectric coating reflection variation over a wide or higher temperature range. This means that the bandpass filters should be appropriately selected to have a center wavelength sufficiently far from the dichroic reflectance transition so that temperature changes (which can shift the reflectance transition point) have negligible effect on the reflected light signals. Thus, filters $107_1$ and $107_n$ should have widths which maximize the amount of return signal over various temperature ranges or disk coating variations.

Reference light signal $104_1$ is then transmitted to photodiode $109_1$ while position light signal $104_n$ is transmitted to photodiode $109_n$. Both photodiode $109_1$ and $109_n$ are preferably PIN photodiodes operated in the photoconductive mode for maximum linearity and low noise characteristics. These photodiodes may appropriately be selected for good spectral response at the light source 103 wavelength as well as temperature insensitivity.

Thereafter, both the reference light signal $104_1$ and the position light signal $104_n$ are transmitted to processing circuit 111. Processing circuit 111 is configured to compare the reference light signal with the position light signal to determine position of the disk or plate 131 by methods known in the art, such as by comparing the magnitude or phase of the two signals. Processing circuit 111 may be further configured to determine or otherwise calculate the ratio of return signal between the reference light signal $104_1$ and the position light signal $104_n$ as a function of angle or movement, as appropriate. Thus, in one embodiment, processing circuit 111 may be configured to provide an output signal based on the following equation or expression:

$$\text{(Angular or Linear) Position} = K((REF_{initial}/REF_{current})(SIGNAL-SIGNAL_{min})/(SIGNAL_{max}-SIGNAL_{min}))$$

where $REF_{initial}$ is the initial reference signal emitted from light source 103 (e.g., 103a), $REF_{current}$ is the measured reference light signal (e.g., $104_1$), SIGNAL is the measured signal from the signal detector (e.g., $104_n$), $SIGNAL_{max}$ is the position maximum signal stored in processing circuit 111, $SIGNAL_{min}$ is the position minimum signal stored in processing circuit 111 and K is a scalar multiplier. In this example, K is a constant set such that the position of the member being sensed (e.g., valve plate) is correct for the angles measured. While K may be determined by measuring the reflections a function of angle, it can also be a variable value that is stored in processing circuit 111. Thus, as any light signal degrades, $REF_{current}$ will reduce, but such a reduction also occurs to SIGNAL proportionately due to the use of a common mode approach. The same light source, thin film coating and light transmitter are used in common mode so that any drift or change is recorded by the REF term and can be thus canceled. Thus, the error terms are suitably reduces so that all common mode errors are factored out, resulting in increased system accuracy based on signal ratios.

FIG. 6a illustrates an exemplary phase sensitive detection flow process according to one aspect of the present system. In this exemplary process, an astable multivibrator circuit is introduced (step 601) and configured to modulate a current source which provides current to a broadband light source 103 (step 603). The modulation frequency of the light source may be chosen to match the requirements of the particular application, and in this embodiment, is selected to be approximately 1,000 Hertz. The modulated light signal is then transmitted to the encoder 130. The light signal returned from the encoder 130 is then received by the optical splitter $105_n$ and split into a reference light signal $104_1$ and a position light signal $104_n$, which are then transmitted to photodiode $109_1$ and $109_n$ (FIG. 2) respectively (steps 605, 615). The amplification and detection circuitry may be essentially the same for each photodiode. Both light signals are then first converted to a voltage signal by transimpedance amplifiers of conventional design (steps 605, 615), and then amplified by direct current amplifiers (steps 607, 617) and alternating current amplifiers (steps 609, 619). Both amplified signals $104_1$, $104_n$ are then filtered by bandpass filters (steps 611, 621) to increase the signal to noise ratio of both signals before being applied to phase-switch and low pass filters (steps 613, 623) for signal detection.

In one embodiment, the phase switches are driven in synchrony with the light source 103 through a level shifting amplifier. In another embodiment, the phase switches are configured to detect the alternating current in each signal which represents the optical power incident on each signal and the reference light emitting diode, and convert them to direct current signals. These direct current signals, which represent the optical power incident on the photodiodes, are then filtered by single pole low pass filters. The time constant of the low pass filters may appropriately be chosen for a particular application, and in this application, a time constant of about one-quarter of a second is used. Longer time constants will result in diminished high frequency noise, but at the expense of response time.

The filtered direct current signals, which represent the optical power incident on the photodiodes, may then be applied to analog to digital converters within processing circuit 111 to allow a controller or microprocessor to determine the position of substrate 131, and to provide a digital indication thereof to an optional external computer system 160 or to another appropriate device. Alternatively, analog signal processing may be used to measure the output of photodiodes 107, including conventional components for analog signal computation such as multiplication/division, addition/subtraction, log/antilog and the like.

Figure 7:
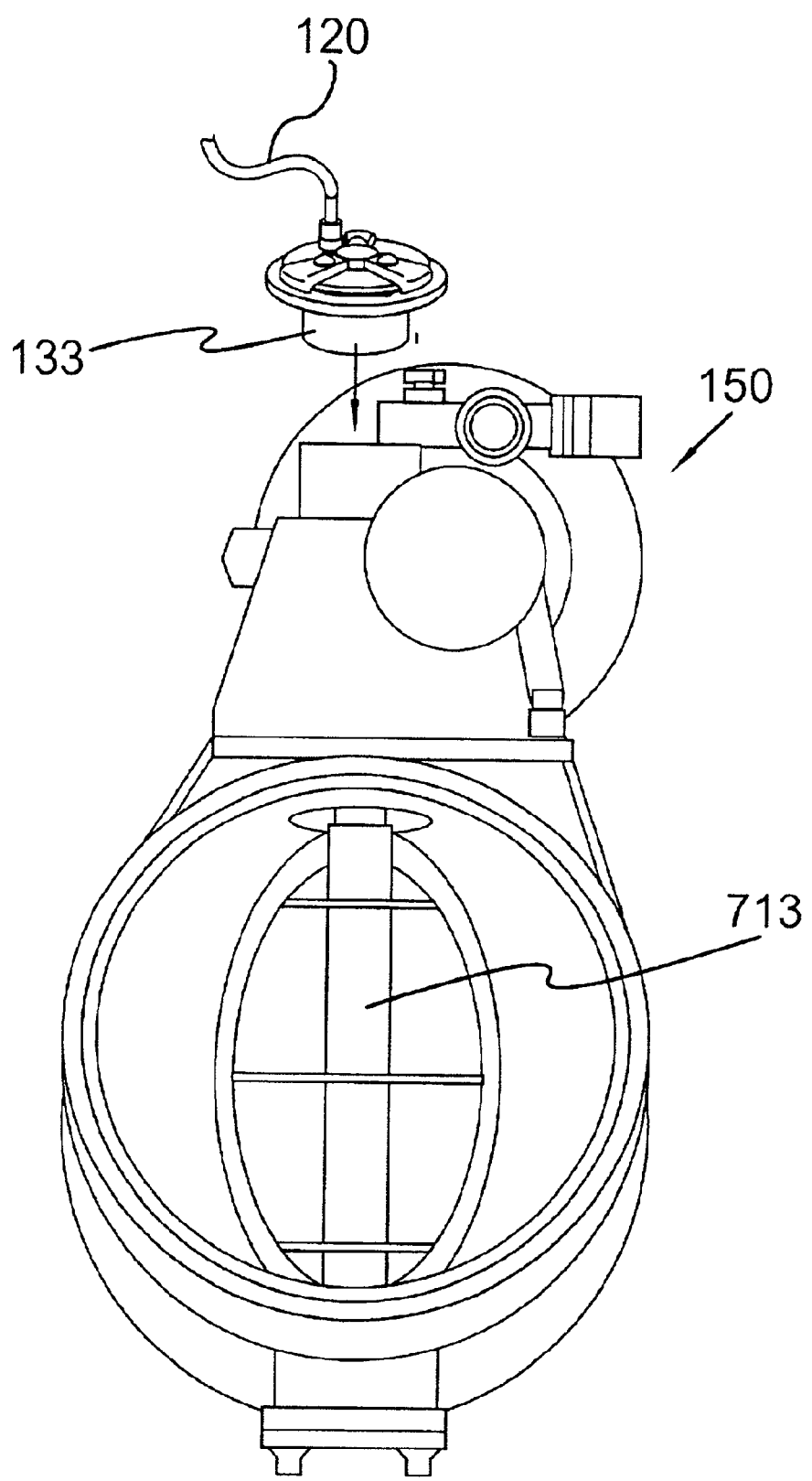
FIG. 7 illustrates one embodiment of the present invention as it may be used in conjunction with a valve assembly having a seal plate.

FIG. 7 illustrates one embodiment of the present system as it may be used in conjunction with a valve assembly. In this example, the encoder housing 133 is coupled to a valve assembly 150 with disk 131 (FIG. 2) communicating directly with a seal plate 713 within valve assembly 150. As discussed previously, all light transmitted to, and received from, disk 131 is communicated through light transmitter 120 (FIG. 1b).

In sum, the present system provides an optical sensor system that may include a light source, an encoder, fiber optics to transport the light to and from the encoder and placed approximately orthogonal to a surface of a disk or plate within the encoder, and a controller. When the light source generates a light signal, it is sent to the encoder through the light transmitter (e.g., fiber optic link). When the light signal is emitted from the end of the light transmitter, the signal impinges on a coated surface located in very close proximity to the light transmitter. Light signals emitted from the fiber end may be reflected directly back into the light transmitter with a high degree of efficiency depending on the dielectric dichroic and metal coatings applied to the disk or plate surface. The disk is allowed to cooperatively rotate with a seal plate to obtain angular position, or alternatively, a plate is allowed to cooperatively translate with a moving object to obtain linear position. The disk consists of a substrate, upon which is deposited a first metallic coating and a second dichroic coating. The thin dielectric layer protects the metallized layer from degradation by oxidation and acts as a long pass filter whose reflectivity transition from maximum to minimum reflectivity cuts halfway through the wideband light source central emission wavelength. The dielectric coating will reflect nearly 100 percent of the emission on the short wavelength side back towards the light transmitter thereby forming a positional insensitive reference signal. The dielectric coating exhibits very low reflectivity on the long wavelength side making it effectively transparent to long wavelength light signals. Light that passes through this thin dichroic layer can then reflect off the metallic layer. Since the first and second layers are very thin, the long and short wavelength reflections are reflected back into the fiber optic with the same degree of coupling efficiency. The reflected light signal will then be split by an optical splitter to obtain a reference light signal and a position light signal. Both signals are appropriately collimated and filtered so that the reference filter will only pass through that light emission which was 100 percent reflected from the dichroic layer, and the position filter will only pass through the position signal.

Many applications or uses of the present sensor can be formulated. For example, one of skill in the art will appreciate that communication path or network 170 may include any system for exchanging data, such as the Internet, an intranet, an extranet, WAN, LAN, satellite communications, wireless communication, and/or the like. The users may interact with the system via any input device such as a keyboard, touch-screen, or mouse and/or the like. Similarly, the sensor could be used in conjunction with any type of a computing system 160, including a personal computer, network computer, workstation, minicomputer, mainframe, or the like running any operating system such as any version of Windows, Windows NT, Windows ME, Windows 2000, Windows 98, Windows 95, MacOS, OS/2, BeOS, Linux, UNIX, or the like. Moreover, although the present system may be implemented with TCP/IP communications protocols, it will be readily understood that it could also be implemented using IPX, Appletalk, IP-6, NetBIOS, OSI or any number of existing or future protocols.

Computing system 160 may further include a processor for processing digital data, memory coupled to the processor for storing data corresponding to the operation of the valve assembly, at least one input coupled to any processor for inputting data, at least one application program stored in memory and accessible by the processor for processing the data, at least one display coupled to the processor and memory for displaying information derived from the data processed and at least one database. The databases may further include look up tables, data tables or like data structures corresponding to valve position, and may be organized in any suitable manner. Each database may be any type of database, such as relational, hierarchical, object-oriented, and/or the like.

The present system may be described herein or illustrated in terms of functional block components, screen shots, optional selections and various processing steps. It should be appreciated that such blocks may be realized by any number of hardware and/or software components configured to perform the specified functions. For example, the present system may employ various integrated circuit components, e.g., memory elements, processing elements, logic elements, look-up tables, and the like, which may carry out a variety of functions under the control of one or more microprocessors or other control devices. Similarly, any software elements of the present system may be implemented with any programming or scripting language. Further, it should be noted that the present system may employ any number of conventional techniques for data transmission, signaling, data processing, network control, and the like. Still further, the system could be used to detect or prevent security issues with a client-side scripting language, such as JavaScript, VBScript or the like.

Other variations and modifications of the present invention will be apparent to those of ordinary skill in the art, and is not limited except by the appended claims. The particular values and configurations discussed above can be varied, and are cited to illustrate particular embodiments of the present invention. It is contemplated that the use of the present invention can involve components having different characteristics as long as the principles disclosed herein are followed.

What is claimed is:

1. An optical sensor system for sensor valve position comprising:
    an encoder, the encoder comprising at least one substructure having a first coating applied over a surface of the substructure, and at least a second coating applied over the first coating; and
    a light transmitter in light communication with the encoder; and
    a controller in light communication with light transmitter, the controller including:
        a light source,
        an electrical circuit in communication with and controlling the light source to transmit light to the light transmitter,
        one or more light splitters in communication with the light transmitter,
        a light detection circuit in communication with each light splitter, the light detection circuit configured to detect optically reduced light signals, and
        a phase sensitive detection circuit in communication with each light splitter.

2. The sensor system according to claim 1, the controller further communicating with a computing system through at least a first data communication network.

3. The sensor system according to claim 1, the phase sensitive detection circuit further comprising a first filter in communication with the light splitter through a first optical lens, a first photodiode in communication with the first bandpass filter, a processing circuit in communication with the first photodiode, a second photodiode in communication with the processor, and a second filter in communication with the second photodiode, the second filter in communication with the light splitter though a second optical lens.

4. The sensor system according to claim 3, the light transmitter having a first end, the first end disposed approximately 0.002 inches from the substrate surface.

5. The sensor system according to claim 1, the encoder further including a substrate, a first coating applied to a surface of the substrate, and a second coating applied to the first coating.

6. The sensor system according to claim 5, the substrate being formed from an aluminosilicate material.

7. The sensor system according to claim 6, the first coating being a variable metal coating.

8. The sensor system according to claim 7, the metal coating being an inconel coating.

9. The sensor system according to claim 8, the second coating being a dielectric dichroic coating.

10. The sensor system according to claim 9, the metal coating being applied over the surface and configured to exhibit a linear reflectance over a predetermined movement of the substrate.

11. The sensor system according to claim 10, the linear reflectance ranging from approximately and at least 0 to 60 percent.

12. The sensor system according to claim 11, the second coating configured to allow setting a predetermined transition point characteristically exhibiting a high reflectance to low reflectance transition within a small wavelength range.

13. The sensor system according to claim 12, the second coating configured to allow setting a predetermined transition point characteristically exhibiting a transparent characteristic when light wavelengths above the transition point are reflected off the second coating.

14. The sensor system according to claim 13, the second coating configured to have a transition point of approximately 825 nanometers.

15. The sensor system according to claim 14, the light transmitter configured to transmit light and the encoder configured to selectively provide encoded information at operating temperatures of up to 650° Celsius.

16. The sensor system according to claim 15, the light transmitter being located approximately within 0.002 inches of the encoder.

17. The sensor system according to claim 1 further comprising an actuator in communication with a valve assembly and the encoder.

18. A method for sensing the position of a member within an assembly, the method comprising the steps of:
    coupling a controller to an encoder through a light transmitter, the encoder being in communication with the member, the controller further including a light source, an electrical circuit in communication with, and controlling the light source to transmit light to, the light transmitter, and a light detection circuit in communication with one or more light splitter, the light detection circuit configured to detect optically reduced light signals, the encoder further comprising at least one substructure having a first coating applied over a surface of the substrate, and at least a second coating applied over the first coating;
    allowing the controller to generate a light signal having a predetermined spectral width and modulation frequency;
    transmitting the light signal to the encoder;
    allowing the encoder to reflect at least a reference light signal and at least a position light signal back to the light transmitter;
    transmitting each reference light signal and each position light signal back to the controller through the light transmitter; and
    allowing the controller to compare the reference light signal with the position light signal to determine a position of the substrate and calculate the ratio of return signal as a function of movement.

19. The method according to claim 18, the substrate being formed from an aluminosilicate material.

20. The method according to claim 19, the first coating being a variable metal coating.

21. The method according to claim 20, the metal coating being an inconel coating.

22. The method according to claim 21, the second coating being a dielectric dichroic coating.

23. The method according to claim 22, the metal coating being applied over the surface and configured to exhibit a linear reflectance over a predetermined movement of the substrate.

24. The method according to claim 23, the linear reflectance ranging from approximately and at least 0 to 60 percent.

25. The method according to claim 24, the second coating configured to allow setting a predetermined transition point characteristically exhibiting a high reflectance to low reflectance transition within a small wavelength range.

26. The method according to claim 25, the second coating configured to allow setting a predetermined transition point characteristically exhibiting a transparent characteristic when light wavelengths above the transition point are reflected off the second coating.

27. The method according to claim 26, the second coating configured to have a transition point of approximately 825 nanometers.

28. The method according to claim 26, the light transmitter configured to transmit light and the encoder configured to selectively provide encoded information at operating temperatures of up to 650° Celsius.

29. The method according to claim 28, the light transmitter being located approximately within 0.002 inches of the encoder.

30. The method according to claim 29 further comprising an actuator in communication with a valve assembly and the encoder.

31. The method according to claim 28, the controller further including a light detection circuit, the step of allowing the controller to determine a position of the substructure being executed by allowing the light detection circuit to calculate an output signal based on the expression:

$$(\text{Angular or Linear}) \text{ Position} = K((REF_{initial}/REF_{current})(SIGNAL - SIGNAL_{min})/(SIGNAL_{max} - SIGNAL_{min}))$$

where $REF_{initial}$ is an initial reference signal emitted from the light source, $REF_{current}$ is the measured reference light signal, SIGNAL is the measured position light signal, $SIGNAL_{max}$ is a position maximum signal stored in the light detection circuit, $SIGNAL_{min}$ is the position minimum signal stored in light detection circuit, and K is a scalar multiplier.

32. An optical encoder for use within an optical sensor system, the encoder comprising: a substrate having a surface; a variable metal coating applied over the surface, the metal coating configured to exhibit a linear reflectance that ranges from approximately 0 to 60 percent over a predetermined movement of the substrate; and at least a second coating wholly applied over the metal coating; wherein the second coating configured to allow setting a predetermined transition point characteristically exhibiting a high reflectance to low reflectance transition within a small wavelength range.

33. The optical encoder of claim 32, the substrate being formed of fused silica.

34. The optical encoder of claim 32, the metal coating being an inconel coating.

35. The optical encoder of claim 32, the second coating being a dielectric dichroic coating.

36. The optical encoder of claim 32, the second coating configured to allow setting a predetermined transition point characteristically exhibiting a transparent characteristic when light wavelengths above the transition point are reflected off the second coating.

37. The optical encoder of claim 36, the light transmitter configured to transmit light and the encoder configured to selectively provide encoded information at operating temperatures of up to 650° Celsius.

38. The optical encoder of claim 37, the second coating configured to have a transition point of approximately 825 nanometers.

39. The optical encoder of claim 32, the metal coating being partially applied over the surface in a gradient manner.

* * * * *